United States Patent
Braunhut

[15] 3,686,788
[45] Aug. 29, 1972

[54] INSECT TRAP

[72] Inventor: Harold N. Braunhut, c/o Honey Toy Industries, 200 Fifth Ave., New York, N.Y. 10010

[22] Filed: Sept. 3, 1970

[21] Appl. No.: 69,230

[52] U.S. Cl. ................................................43/110
[51] Int. Cl. ..............................................A01m 1/10
[58] Field of Search........43/110, 107, 121, 131, 129, 43/132

[56] References Cited

UNITED STATES PATENTS

| | | | |
|---|---|---|---|
| 2,383,960 | 9/1945 | Dupuy | 43/131 |
| 3,494,067 | 2/1970 | Potrzuski | 43/110 |
| 15,752 | 9/1856 | Arnold | 43/110 |
| 759,030 | 5/1904 | Sheaffer | 43/131 |
| 1,700,517 | 1/1929 | Ross | 43/131 |

*Primary Examiner*—Warner H, Camp
*Attorney*—Friedman & Goodman

[57] ABSTRACT

An insect trap constructed preferably of transparent plastic, including two hollow telescopable cylinders and a cylindrical plug. When telescoped, the cylinders are rotatably and slidably mounted upon the other. Each of the cylindrical side walls of the cylinders is divided into a plurality of longitudinally directed circumferentially spaced alternating slots and dependent segments. The segments of one cylinder are disposed and dimensioned so as to cover the slots of the other cylinder in the closed position, and uncover the slots in the opened position. The end wall of each cylinder is provided with a centrally located circular opening. The cylindrical plug is provided with a selected outer diameter to enable it to be slidably inserted in each circular opening, the plug being of a length to reach from one end wall to the other end wall when the cylinders are in the telescoped position. The plug may be lifted out of one of the circular openings to allow the captured insects to be transferred through the unpluged opening into another container.

10 Claims, 8 Drawing Figures

PATENTED AUG 29 1972

HAROLD N. BRAUNHUT
INVENTOR

Friedment Goodman
ATTORNEYS

PATENTED AUG 29 1972

HAROLD N. BRAUNHUT
INVENTOR

Friedman

ATTORNEY

INSECT TRAP

BACKGROUND OF THE INVENTION

The study and breeding of insects has for a long time been a source of knowledge, education, diversion and entertainment. Efficient traps and containers for transporting and transferring these insects for use in science study or other purposes are needed. This invention is related to trapping means for insects, such as ants, which may be attracted by suitable baiting means, such as food or other attractive materials, and to devices for transporting and transferring the entrapped insects as desired.

SUMMARY OF THE INVENTION

A three-part trap comprising an outer and an inner hollow telescopable and rotatable cylinder and a cylindrical plug, each cylinder having an end wall and side walls, the end walls each being provided with a central circular opening into which the cylindrical plug may be fitted. The side walls of the cylinders are provided with a plurality of peripheral slots and segments arranged so that the cylinders may be rotated to have the segments of one opposite to and extend beyond the edges so as to completely cover the slots of the other to define a closed position, or to have the slots of one overlie the slots of the other to define an opened position. The inner cylinder is provided with a rotation guide slide groove with an outer flange provided with alternating peripheral slots and segments corresponding to the slots and segments of the side wall of the inner cylinder, with wedge shaped ends and stopping wedges on one or more of the flange segments corresponding with wedge-shaped depressions in the correlating segments of the outer cylinder. Lifting the plug out of one of the circular openings allows the captured insects to be transferred through the unplugged opening to another receptacle.

It is a primary object of the present invention to provide a simple unit to which insects will be attracted, and allowed or enticed to enter and then held captive.

Another object of the invention is to provide a trap which may be used to transport the insect if desired, and from which the contents may be transferred to another device with facility and ease, and from which the possibility of escape, accidental or otherwise, is a minimum.

It is a further object of the present invention to provide a trap in which the insect may be kept for a longer or shorter period of time in a comfortable and humane manner.

A still further object of the present invention is to provide a device satisfying the above objectives, and in which the insects need not be touched or otherwise handled or manipulated.

Yet another object of the present invention is to provide a device of the character as above described, and in which the contents are visible and may be inspected and studied at all times.

And yet another object of the present invention is to provide a device which is suitable for use by children as well as adults.

And still yet another object of the present invention is to provide a device of the character as herein described, which may further be used as a source of education, study and entertainment.

An additional feature of the present invention is the provision of a device which is economical to manufacture, requires a minimum of parts, is simple and easy to assemble, maintain and use.

BRIEF DESCRIPTION OF THE DRAWINGS

Having in mind the above and other objects that will be evident from an understanding of this disclosure, the invention comprises the devices, combinations and arrangements of parts as illustrated in the presently preferred embodiment of the invention which is hereinafter set forth in such detail as to enable those skilled in the art readily to understand the function, operation, construction and advantages of it, when read in conjunction with the accompanying drawings, in which.

DESCRIPTION OF THE INVENTION

Figure 1:
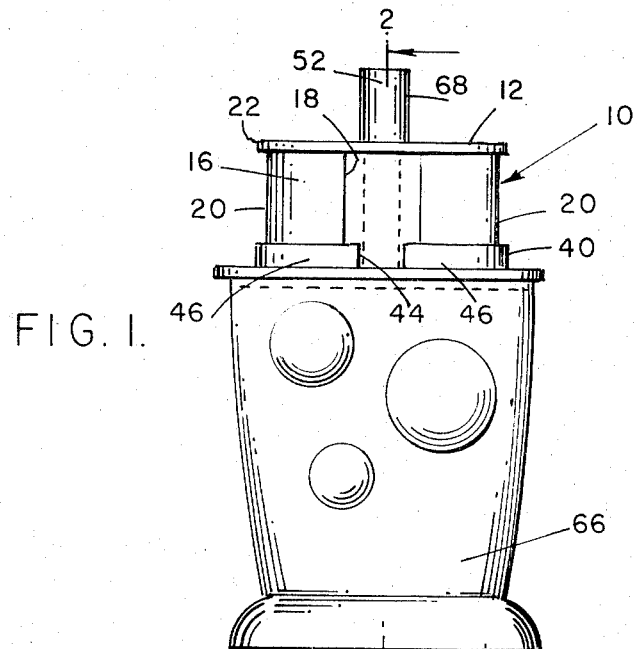
FIG. 1 is a front elevational view of an insect trap pursuant to the present invention, showing the insect trap placed upon an insect receiving receptacle with the transferring plug in the transfer position.

The trap includes three main elements, an outer telescoping cylinder 10, an inner telescoping cylinder 26 and an exit plug 52. The elements are constructed of a suitable material, preferably a transparent plastic.

Outer telescoping cylinder 10 and inner telescoping cylinder 26 are provided with end walls 12 and 28, respectively. End walls 12 and 28 are each provided with a circular opening or aperture 14 and 30, respectively. Cylindrical side walls 16 and 32 of outer cylinder 10 and inner cylinder 26, respectively, are provided with peripheral slots symmetrically disposed as shown at 18 and 34, respectively. Slots 18 and 34 extend longitudinally to end walls 12 and 28, respectively.

Outer cylindrical side wall 16 and inner cylindrical side wall 32, therefore, are comprised of symmetrically disposed outer segments 20 and symmetrically disposed inner segments 36 alternating with symmetrically disposed outer side wall slots 18 and symmetrically disposed inner side wall slots 34, respectively. Outer cylinder end wall 12 is provided with a rim 22 extending beyond outer cylinder side wall 16.

Inner cylinder end wall 28 is also provided with a rim 38 extending beyond the inner cylinder side wall 32. Rim 38 is provided with a perpendicularly extending side wall 40. Side wall 40 is spaced in relationship and parallel to inner cylinder side walls 32. Rim 38 and its side wall 40 in conjunction with the inner cylinder side wall 32 form an inner cylinder guide groove 54 of sufficient width to accommodate the thickness of the outer cylinder side wall segments 20. Outer cylinder 10 when telescoped onto the inner cylinder 26 is rotatable, with the outer cylinder dependent segments 20 sliding within the inner cylinder guide groove 54 and retained in position in the groove 54 by the inner cylinder flange 40.

Figure 5:
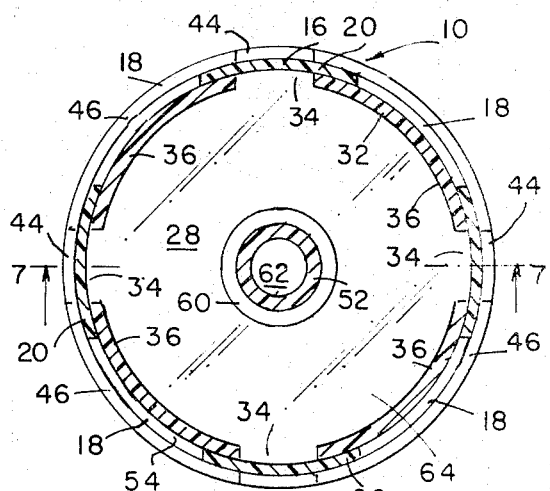
FIG. 5 is a sectional view similar to FIG. 4, showing the device in a closed position.
Figure 6:
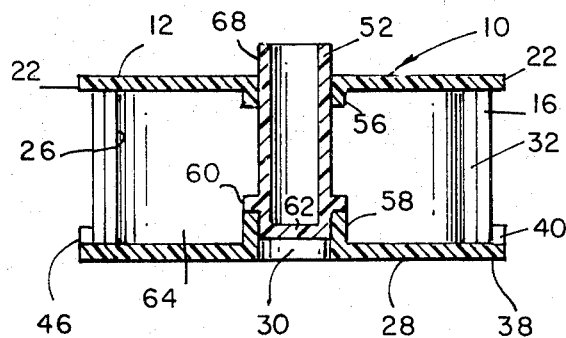
FIG. 6 is a sectional view taken along line 6—6 of FIG. 4.
Figure 7:
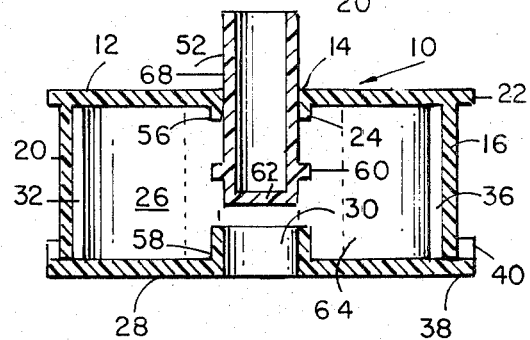
FIG. 7 is a sectional view taken along line 7—7 of FIG. 5.

As may be noted from the drawings, the symmetrically disposed inner cylinder side wall slots 34 are of narrower width than the equal in number symmetrically disposed outer side wall slots 18. The side wall slots 34 are also narrower in width than the equal in number symmetrically disposed outer side wall segments 20. It therefore is obvious that the symmetrically disposed inner side wall segments 36 are wider than the equal in number symmetrically disposed inner side wall slots 34 and also of greater width than the symmetrically disposed and equal in number outer cylinder segments 20 or slots 18. It is therefore readily seen, as shown in FIGS. 4 through 7, that the cylinders when telescoped onto each other may be rotated with respect to each other to the open positions as in FIGS. 4 and 6, where the slots are positioned so as to have the slots 18 of the outer cylinder 10 aligned with the slots 34 of the inner cylinder 26, or rotated to another or closed position as shown in FIGS. 5 and 7, where the segments 20 of the outer cylinder 10 are in opposition to inner cylinder slots 34, where the segments 20 of the outer cylinder 10, because of their greater width, overlap the slots 34 of the inner cylinder 26.

Inner cylinder side wall 40 is provided with, or has cut into it, slots 44. The slots 44 are equal in number and width to the inner cylinder side wall slots 34. Inner cylinder side wall 40, thus, includes inner cylinder side wall segments 46 alternating with the slots 44.

Figure 8:
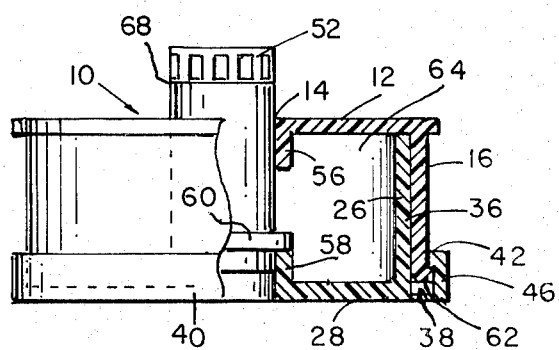
FIG. 8 is a fragmentary, elevational view, in section, of a modified form of the device provided with a locking rim to prevent separation of the telescoped cylinders.

As appears in FIG. 8, to retain and lock the outer cylinder 10 in its telescoped position upon the inner cylinder 26, each of the outer cylinder side wall dependent segments 20 may be provided with outwardly extending flanges 62. The guide groove side wall segments 46 may be provided with inwardly extending flanges 42 to cooperate with the flanges 62 to retain the outer cylinder 10. The width of the guide groove 54 may be modified to accommodate the flanges 62.

One or more of the guide groove side wall segments 46 may be provided with inwardly extending stopping wedges (not shown) and one or more of the edges of the outer cylinder dependent segments 20 may be provided with complementary wedge-shaped chambers (not shown), these wedges and complementary chambers may serve as rotation limiting means as well as to frictionally hold and retain the cylinders in the telescoped position.

As hereinbefore described, the end walls 12 and 28 of cylinders 10 and 26, respectively, are each provided with centrally located circular openings 14 and 30, respectively. Circular openings 14 and 30 may further be provided with flanges 56 and 58, respectively, to guide the exit plug 52, as will be hereafter described.

Cylindrical plug 52 is provided with an outer diameter of a predetermined size to enable it to be slidably inserted and to close off the circular openings 14 and 30. It is of sufficient length to reach from the end wall 28 of the inner cylinder 26 to the end wall 12 of outer cylinder 10 when the outer cylinder 10 is telescoped onto the inner cylinder 26, and to provide a slight overlap at the end wall 12 of the outer cylinder 10 for a function which will be hereafter described. Plug 52 is also provided with an annular retaining ring 60 in spaced relation with one end as will also be hereinafter described. The plug 52 may be a solid element or may be tubular in construction as shown, where the end adjacent to the ring 60 is preferably closed at 62.

The trap is assembled by inserting the cylindrical plug 52 into the annular opening 30 of the inner cylinder 26 with the annular retaining ring 60 impinging upon the end wall 28 or its flange 58. Ring 60 is spaced from the end of plug 52 so that the end of the plug when inserted will be flush with the outer surface of the inner cylinder end wall 28. Outer cylinder 10 is now placed upon plug 52, with the other end of the plug 52 now extending through the annular opening 14 of the end wall 12 of the outer cylinder 10. The telescoped cylinders may now be rotated with reference to each other to a position where the outer cylinder side wall slots 18 are opposite to and uncover the inner cylinder side wall slots 34, or to a position where the outer cylinder segments 20 are opposite to and because of their greater width overlap and close off the inner cylinder side wall slots 34.

Figure 3:
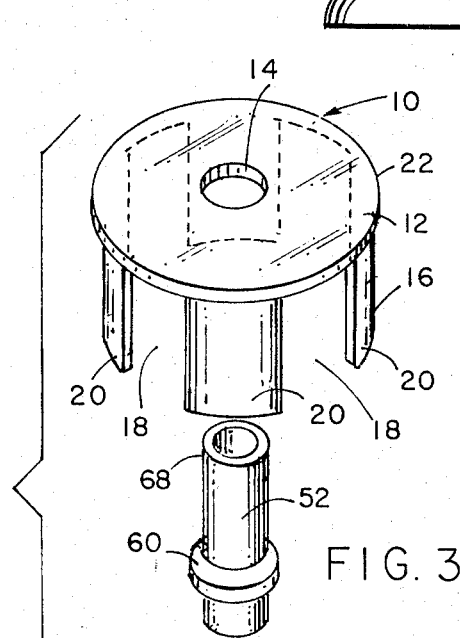
FIG. 3 is an exploded perspective view showing three elements of the present invention.
Figure 2:
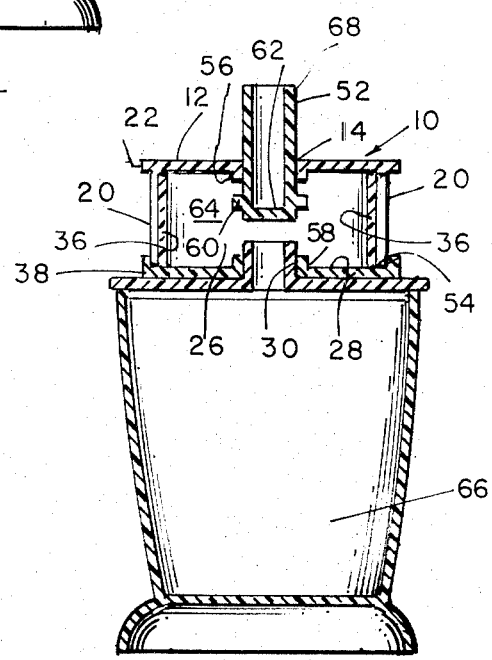
FIG. 2 is a sectional view of the present invention, taken along line 2—2 of FIG. 1.
Figure 4:
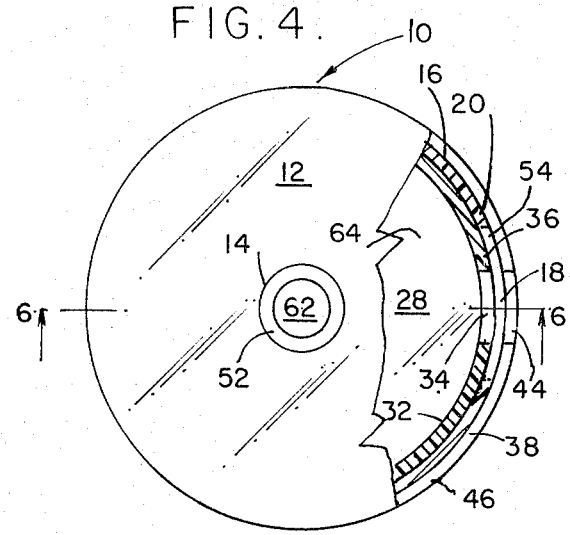
FIG. 4 is a fragmentary, top plan view, in section, of the device in a trapping or open position.

While the outer cylinder and wall slots 18 are shown as in FIGS. 2 and 3 as extending the entire length of the outer cylinder side wall 16, they may be of shorter length, thus providing for a stronger side wall if desired.

Attractive material, such as food, may be placed in the main trap chamber 64 formed by the cylinders 10 and 26 when telescoped together. The trap may be placed in an area known to be frequented by the insects, such as ants, to be collected or trapped with the trap adjusted to the open position. The insects, attracted by the lure, will find little or no hindrance to entry, and will enter the device. The cylinders of the trap may then be rotated to the closed position with the insects entrapped. The device may be used to entrap a plurality of insects prior to being closed. The entrapped insects may now be conveniently transported, whereby the insects may be conveniently transferred to another container, such as a receiving receptacle 66, as shown in FIGS. 1 and 2.

The trap is placed upon the receiving receptacle 66, the end 68 of the plug 52 projecting beyond the end wall 12 of the outer cylinder 10 is grasped and lifted. Plug 52 as shown in FIG. 2, may now be lifted until the ring 60 impinges upon the inner surface of the end wall 12 or its flange 56, if provided. The insects may now conveniently be transferred or will escape into the new container or receptacle 66 through the annular opening 30 in the inner cylinder end wall 28. For greater convenience and ease in handling, operating and carrying the trap, the rims 22 and 38 have been provided.

Numerous alterations of the structure herein disclosed will suggest themselves to those skilled in the art. However, it is to be understood that the present disclosure relates to a preferred embodiment of the invention which is for purposes of illustration only, and not to be construed as a limitation of the invention.

What is claimed is:

1. An insect trap comprising an outer and an inner hollow cylinder adapted to rotatably telescope one upon the other, said trap having an open and a closed position, each of said cylinders being provided with a circular end wall closing one end of each cylinder and a longitudinally dependent cylindrical side wall, the other end of each of said cylinders being open, each of said cylindrical side walls being divided into a plurality of longitudinally directed circumferentially spaced alternating slots and segments with said segments on each outer cylinder side wall being equal in number to said slots on said inner cylinder side wall and disposed and dimensioned so as to cover and overlap said slots when said outer cylinder is rotated to the closed position, said slots on said outer cylinder side wall being disposed so as to be opposite said slots on said inner cylinder side wall when said outer cylinder is rotated to the open position, at least one of said side end walls being provided with an aperture therethrough, and the other of said end walls being provided with means movable between a first position closing said end wall aperture when said hollow cylinders are telescoped upon each other and a second position opening said end wall aperture when said insect trap is in said closed position.

2. An insect trap comprising an outer and an inner hollow cylinder adapted to rotatably telescope one upon the other, said trap having an open and a closed position, each of said cylinders being provided with a circular end wall closing one end of each cylinder and a longitudinally dependent cylindrical side wall, the other end of each of said cylinders being open, each of said cylindrical side walls being divided into a plurality of longitudinally directed circumferentially spaced alternating slots and segments with said segments on each outer cylinder side wall being equal in number to said slots on said inner cylinder side wall and disposed and dimensioned so as to cover and overlap said slots when said outer cylinder is rotated to the closed position, said slots on said outer cylinder side wall being disposed so as to be opposite said slots on said inner cylinder side wall when said outer cylinder is rotated to the open position, each of said end walls being provided with a centrally located annular opening of the same radius, and a cylindrical plug adapted to be removably inserted into each annular opening to close the annular openings when said hollow cylinders are telescoped upon each other.

3. An insect trap comprising an outer and an inner hollow cylinder adapted to rotatably telescope one upon the other, said trap having an open and a closed position, each of said cylinders being provided with a circular end wall closing one end of each cylinder and a longitudinally dependent cylindrical side wall, the other end of each of said cylinders being open, each of said cylindrical side walls being divided into a plurality of longitudinally directed circumferentially spaced alternating slots and segments with said segments on each outer cylinder side wall being equal in number to said slots on said inner cylinder side wall and disposed and dimensioned so as to cover and overlap said slots when said outer cylinder is rotated to the closed position, said slots on said outer cylinder side wall being disposed so as to be opposite said slots on said inner cylinder side wall when said outer cylinder is rotated to the open position, said end wall of said inner cylinder being provided with an outwardly extending rim projecting beyond said inner cylinder side wall, said rim being provided with a perpendicular side wall, said perpendicular side wall being divided into a plurality of slots and segments equal in number and disposed in the same manner as said slots and segments on said inner cylinder side wall.

4. An insect trap according to claim 2, wherein said cylindrical plug is provided with a retaining ring at substantially one of its ends, said retaining ring being adapted to prevent passage of said ring through either of said end walls.

5. An insect trap according to claim 2, wherein each of said end walls includes a longitudinally dependent annular guide flange surrounding said annular opening.

6. An insect trap according to claim 1, wherein each of said end walls is provided with an outwardly extending rim extending beyond said cylindrical side walls.

7. An insect trap according to claim 3, wherein said segments of said perpendicular side wall of said rim extension is provided with an inwardly extending perpendicular flange, and said dependent segments of said side wall of said outer cylinder is provided with an outwardly extending flange adapted to slide under said inwardly extending flange.

8. An insect trap according to claim 3, wherein one of said segments of said cylinder rim extension side wall is provided with a wedge-shaped projection, and one of said dependent segments of said outer cylinder is provided with a complementary chauffer.

9. An insect trap according to claim 1, wherein said trap is constructed of transparent material.

10. An insect trap comprising a pair of relatively rotatable hollow cylinders telescopically received one within the other, each of said cylinders being provided with an end wall and a longitudinally extending side wall, said side walls each being divided into a plurality of circumferentially spaced alternating slots and segments disposed and dimensioned so that said segments of one cylinder cover and overlay said slots of the other cylinder when said cylinders are relatively rotated to a closed position, said slots in each of said cylinder side walls being disposed in registration with each other when said cylinders are relatively rotated to an open position, said end walls of said cylinders being provided with registering apertures, an axially extending plug disposed within each of said apertures of said end walls, said plug being axially moveable from a position wherein both of said apertures are obstructed to a position wherein one of said apertures is open.

* * * * *